Sept. 11, 1934.                E. W. N. BOOSEY                1,973,304
                                DRAINAGE FITTING
                               Filed May 4, 1933              2 Sheets-Sheet 1

INVENTOR.
EDWARD W. N. BOOSEY
BY
ATTORNEY.

INVENTOR
EDWARD W. N. BOOSEY
BY
ATTORNEY

Patented Sept. 11, 1934

1,973,304

UNITED STATES PATENT OFFICE 1,973,304

DRAINAGE FITTING

Edward W. N. Boosey, Detroit, Mich.

Application May 4, 1933, Serial No. 669,311

7 Claims. (Cl. 182—31)

This invention relates to floor or roof drains particularly adapted for use in conjunction with a flashing apron, and the principal object of the invention is to provide a drain head and a body therefor so constructed that in fastening the said parts together the flashing is clamped by pressure applied to a clamping ring by the drain head.

It is also an object of the invention to provide a drainage fitting having two parts in which the head is attachable to a body and the body is formed to of itself provide a hub for connection of a discharge pipe thereto.

It is also an object and feature of the invention to provide a drainage fitting of two parts in which the head is adjustable relative to the body in order to position the upper strainer end of the head approximately flush with the floor or surface of other structures in which the drainage fitting is secured and to provide in conjunction therewith a construction permitting fluid reaching the apron to flow into the fitting between the head and the body.

These and other objects and various novel features of the invention are hereinafter more fully described and claimed, and the preferred form of the invention is shown in the accompanying drawings in which—

Figure 1:
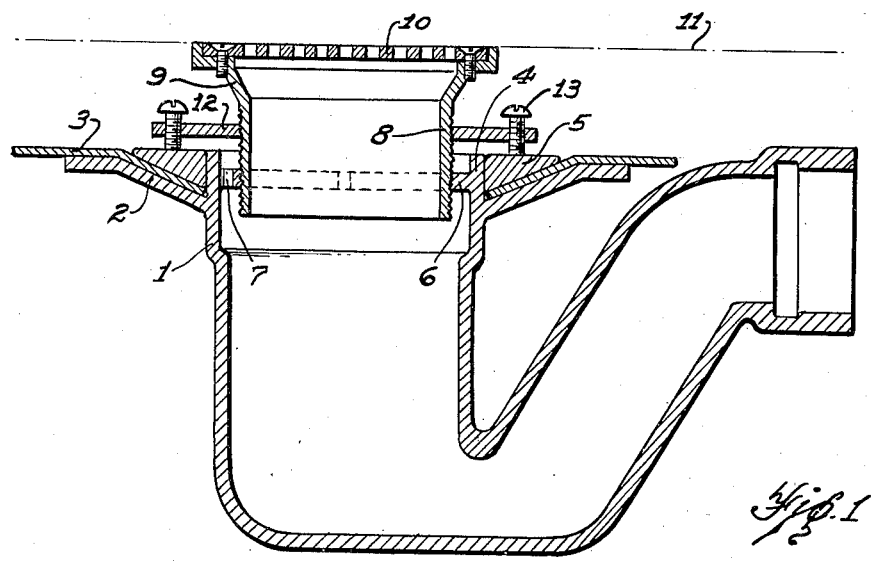
Fig. 1 is a vertical section of a drainage fitting embodying my invention and in which form a trap is formed integral with the body of the fitting.

The invention may be embodied in several different forms of drainage fittings as is shown by the several drawings. In the construction shown in Fig. 1, the drain body 1 has an upwardly inclined flange 2 on which the apertured apron 3 may lie. In this construction the flange 2 is below the upper end 4 of the body portion providing a V shaped annular groove in which a similarly shaped clamping ring 5 may be positioned to engage the apron at the edge surrounding the central aperture thereof. The body 1 is further provided with a flange 6 having a number of apertures one of which is indicated at 7, and this flange is internally threaded to receive the threaded tubular portion 8 of the drain head 9. The drain head is provided with the usual grating 10 through which waste material may flow into the interior thereof from the surface of a floor or other structure indicated by the dotted lines 11.

On the threaded portion 8 of the head is a threaded flange 12 extending laterally therefrom and over the upper surface of the clamping ring 5 and end 4 of the body portion. This flange is out of contact with the said clamping ring and end 4 of the body portion 1 and any liquid seeping through the floor or structure in which the fitting is positioned is arrested by the apron and passes through the space between the flange 12 and the body, entering the body through the upper end and passing through the apertures 7 thereinto. Screws of any approved type, indicated at 13, may be employed around the periphery of the flange and provide a means for clamping the ring 5 onto the apron 3 making a tight joint therewith. By the arrangement of the parts described, it is also to be noted that the upper grated surface of the drain head may be varied in position to conform to the floor level according to the level of the finished floor for instance or other surface in which the fitting is positioned. The flange 12 may also be correspondingly adjusted on the portion 8.

Figure 2:
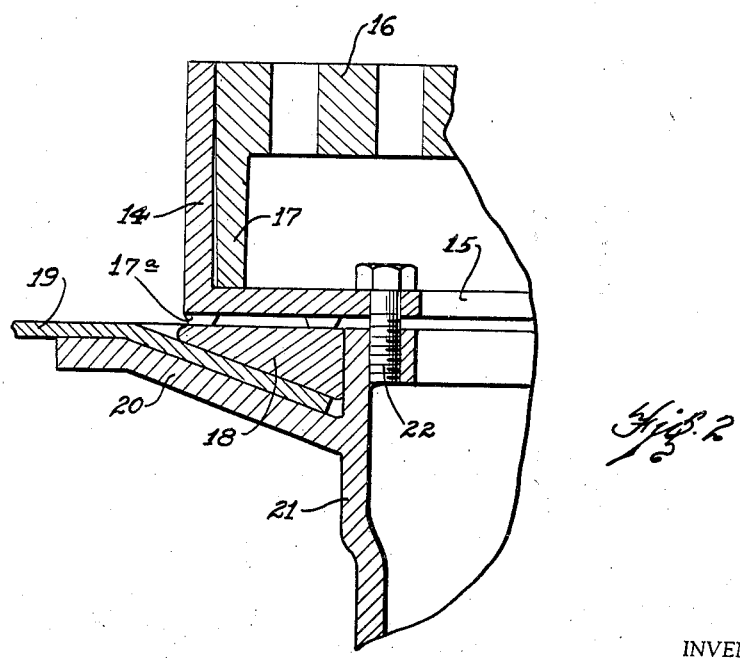
Fig. 2 shows an alternative form of construction of the drain head and manner of securing the same to the body.

The construction shown in Fig. 2 is for a similar purpose and shows one form of construction wherein the drain head by reason of being secured to the body is caused to engage the clamping ring under pressure. In this structure the drain head 14 is cup-shaped in form having a central aperture 15 and a grating member 16 at the top, it being provided with a depending flange portion 17 supporting the upper surface of the grating approximately flush with the upper edge of the peripheral wall of the member 14.

The bottom of the member 14 is formed with projecting knobs or lugs 17a which are positioned to engage the clamping ring 18, the apron 19 extending between the ring and the flange 20 on the body 21 of the fitting. The body is provided with a series of peripheral threaded apertures for bolts 22, only one of which is shown, and which are accessible through the member 14 when the grating is removed. By these bolts, pressure is applied to the clamping ring 18 through the lugs 17a.

Figure 3:
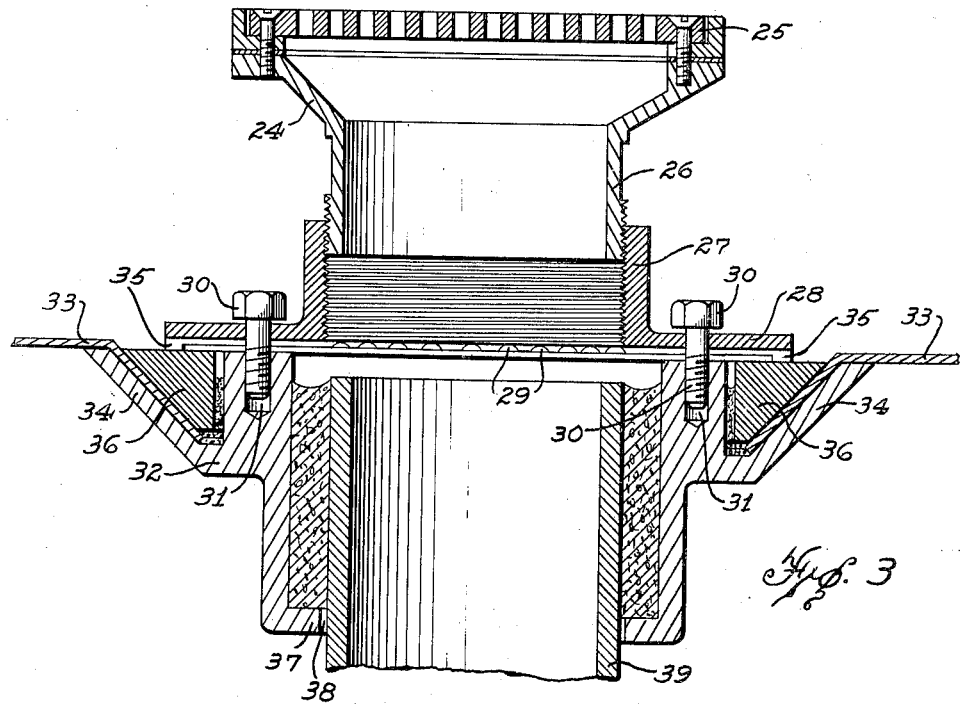
Fig. 3 is another form of the fitting showing the body providing a hub for the attachment of a waste conduit and in which the head is variable in position.

It is not material to this invention whether the body be formed integrally with a trap portion as is shown in Fig. 1 or separately therefrom. Therefore, the fitting may be of the construction shown in Figs. 3 or 4. In Fig. 3 the head is formed of two parts, the portion 24 being of the usual form practically such as is shown at 9 in Fig. 1 and a grating 25 may be provided at the upper end thereof. The tubular portion 26 of the drain head may be externally threaded to fit in the hub 27 of the attached plate 28 which forms a part of the drain head proper. This plate has the lateral portion grooved as at 29 on the under surface and bolts 30 are provided which extend into apertures 31 at the upper end of the body 32 to receive these bolts.

The flashing is indicated at 33 having the periphery about the central aperture lying over an upwardly inclined flange 34 integral with the body and the flange 28 of the portion 27 is formed with a series of lugs 35 which engage the upper surface of the clamping ring 36 which clamps the apron in place against the flange 34. By this arrangement, just above described, the same facility in adjustment of the drain head relative to a floor or other surface is accomplished and the means for securing the head to the body also provides the means for forcing the clamping ring to place and holding the apron securely in position as is the case with the previous forms described.

There is one feature of construction of the form shown in Fig. 3 that is of value and forms a feature of this invention, namely, that the lower end of the body portion has an inturned flange 37 providing a central aperture 38 into which the end of a waste conduit 39 may be introduced and to extend upwardly thereinto to near the top of the body portion. By this arrangement, and prior to the attachment of the drain head onto the body, caulking can be introduced between the pipe and the body and thus the body provides a hub to which the piping may be caulked. Ordinarily, in previous constructions, a hub is provided externally of the fitting and by the arrangement above described the total overall length of the device is reduced to a minimum.

Figure 4:
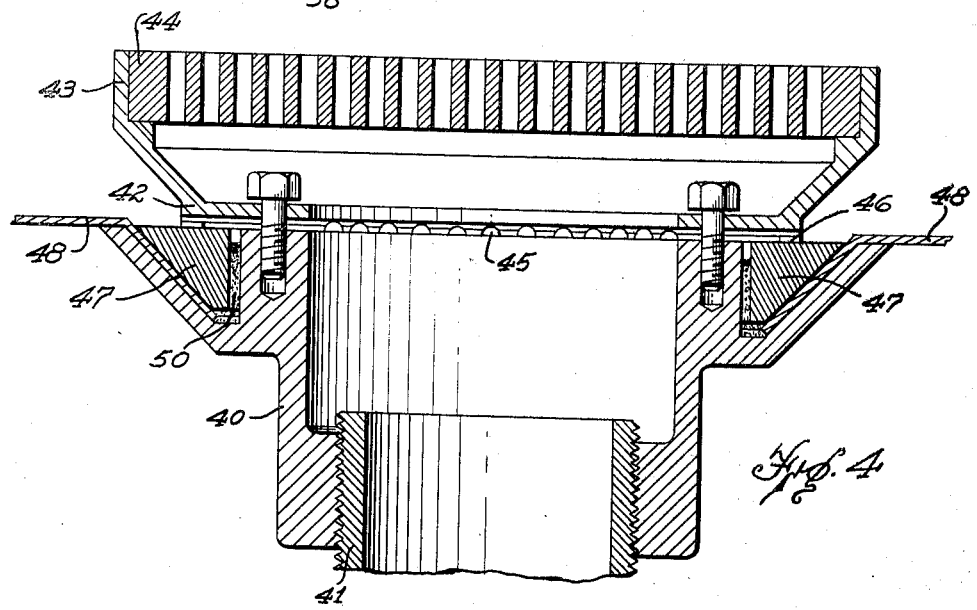
Fig. 4 is another form embodying features of my invention and in which the head proper is of a different type of construction than the other forms but which also embodies the principal features of the invention and including a body providing for threaded association of a waste conduit therewith.

It will be noted in Fig. 4 that the body 40 may be threaded about the aperture in the bottom to receive a threaded pipe 41. Thus either a caulked or threaded connection of the drain pipe to the body may be employed. Likewise, in this latter figure, the flange 42 of the drain head extends internally thereof, there being an upwardly extending outwardly inclined peripheral portion 43 shaped to receive a grating 44 and this form of the drain head and the form shown in Fig. 2 are not adjustable relative to the body.

The flange 42, in the form shown in Fig. 4, is practically identical with the flange 28 of Fig. 3, it having the seepage grooves 45 and lugs 46 that engage the clamping ring 47 and hold the metal apron 48 in place in securing the drain head to the body.

In either of the forms shown, the upwardly inclined flange on the body member permits the apron to be folded down thereinto much more readily than is the case where a vertical flange is utilized. Also in the provision of the clamping member of cast iron or similar surface, it is preferable to use a sealing element such as asphaltum, white lead or the like whereby the rough cast metal surface of the clamping member contacting one side of the apron and the similar surface of the flange contacting the other side of the apron, is filled with the sealing material and a perfect water-proof joint is secured.

In either of the forms shown, the seepage material collecting on the surface of the apron flows over the clamping plate to between the drain head and the body. This sealing material is indicated at 50 in Fig. 4. It is to be understood also, though not so shown, in Figs. 1 and 2, that a sealing material is used therewith.

It will be evident from the foregoing that the invention is not confined to a single character of construction and that various departures can be made from the actual structural features shown, all of which embody the features of the invention as set forth in the appended claims. In either of the forms of the invention shown, the clamping ring is held in place by the attachment of the drain head to the body thereby securely fastening the apron at the point of junction with the fitting and provision is made permitting seepage along the apron to pass into the body of the fitting between the head and the body, and it is further evident that the construction shown embodies the features of the invention in a comparatively simple and inexpensive form readily assembled and installed.

Having thus briefly described my invention, what I claim and desire to secure by Letters Patent of the United States is—

1. A drainage fitting comprising a body member and a drain head, said body member having an inclined flange adjacent its upper end providing a groove extending thereabout, a soft metal apron having a central aperture and lying on the flange of the body, a clamping ring engaging the apron for clamping the same against the flange, bolts for fastening the drain head to the body, and means on the drain head engaging the clamping ring and spacing the head from the body providing a passageway therebetween for liquid accumulating on the apron to pass into the body.

2. A drainage fitting comprising a separable body member and a drain head, means for attaching the two parts together, said body member having a recess for receiving the edge of an apron about an aperture therein, a clamping ring for engaging the apron, and means on the drain head engaging the clamping ring under a pressure produced by the attaching of the head to the body, said means supporting the head and the body member in spaced relation to provide a passageway for seepage accumulating in the apron to pass into the body.

3. A drainage fitting comprising a drain head and a body portion detachably connected together, said drain head comprising a base part of tubular form having a lateral flange and a second part carrying a grating in threaded relation with the tubular portion of the base, said flange of the base extending over the body, clamping bolts extending through the said flange into the body, said body having an upwardly inclined peripheral flange below the upper end thereof providing a groove, an apertured apron having the edge about the aperture lying in the groove, a clamping ring in the groove for engaging the apron, and means on the said flange of the base portion of the head engaging the clamping ring whereby in securing the said base portion to the body the clamping ring is held in pressure contact with the apron.

4. A drainage fitting comprising a drain head and a body portion, bolts for detachably connecting the head to the body, the said body having an annular groove adjacent the upper end, an apertured apron having the edge portion about the aperture lying in the groove, a clamping ring engaging the apron, and means on the head engaging the clamping ring whereby in securing the parts together the clamping ring is held under pressure and a passageway is provided between the head and the body permitting seepage fluid to pass between the head and body to the interior of the body, said body having an inturned flange at the lower open end practically fitting a waste conduit insertible therein and providing a caulking space between the inner face of the body above the flange thereof and the waste conduit.

5. A drainage fitting comprising a separable body member and drain head, said drain head having a lateral flange extending over the head, said body having a peripheral groove thereabout, an apertured apron having the edge portion about the aperture lying in the groove, a clamping ring engaging the said portion of the apron in the groove, and means on the flange for engaging the clamping ring under pressure, the parts being so constructed as to provide a passageway between the flange and the body permitting liquid accumulating on the apron to flow between the parts into the body member.

6. A drainage fitting comprising a drain head and a body member, said drain head having an apertured base portion lying over the said body, an inclined flange on the body providing an annular groove thereabout, an apertured apron having an edge portion lying in the groove, a clamping ring engaging in the groove for securing the apron in place, bolts extending through the said base of the drain head into the body portion for securing the parts together, and lugs on the base portion of the drain head engaging the clamping ring and maintaining the said base and body portion in spaced relation providing a passageway for fluid accumulating on the apron to pass into the body.

7. A drainage fitting comprising a hollow body member having a lateral flange provided with a groove, a drain head having a flange like portion overlying and contiguous to the flange of the body, an apron having an aperture, the body at the end connected with the head having a peripheral groove to receive the edge of the apron about the aperture, a clamping ring for engaging the apron portion lying in the groove, means associated with the flange of the drain head for engaging the clamping ring, and a means for fastening the flange to the body whereby in attaching the head to the body, pressure is applied through the said means associated with the flange to the clamping ring.

EDWARD W. N. BOOSEY.